Dec. 6, 1966    H. E. FRANKENBERG    3,289,891
FOOD CONTAINERS FOR MANNED SPACE SHIPS
Original Filed Nov. 6, 1962    2 Sheets-Sheet 1
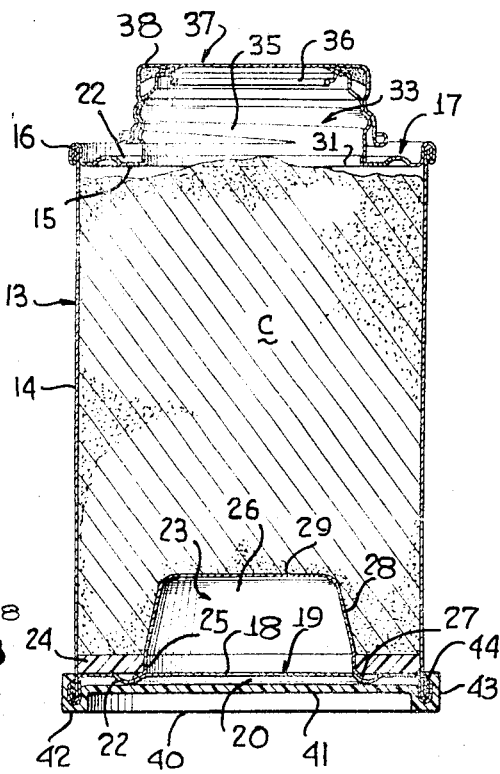
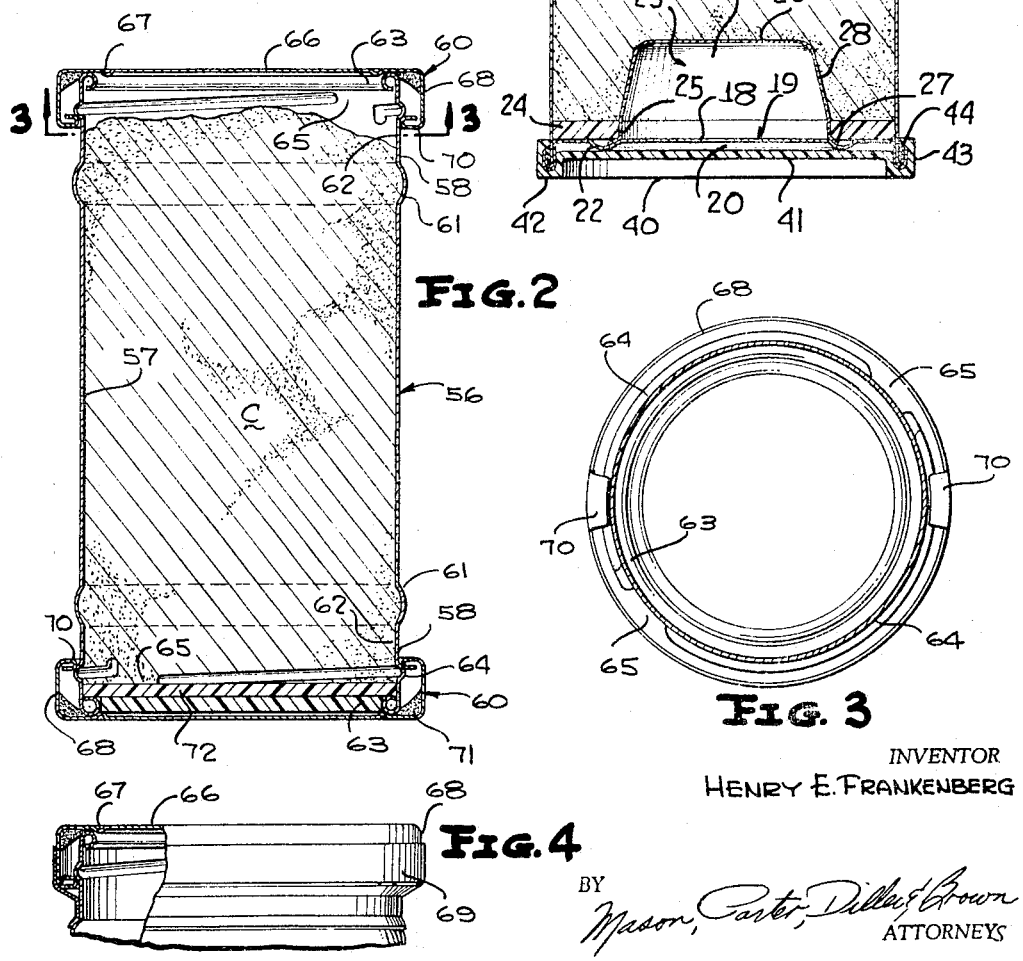
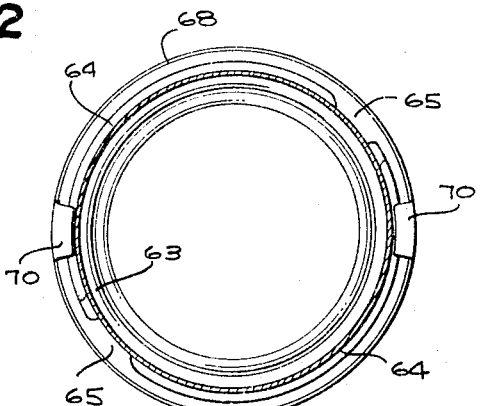
INVENTOR
HENRY E. FRANKENBERG
BY Mason, Carter, Dillon & Brown
ATTORNEYS Dec. 6, 1966   H. E. FRANKENBERG   3,289,891
FOOD CONTAINERS FOR MANNED SPACE SHIPS
Original Filed Nov. 6, 1962   2 Sheets-Sheet 2
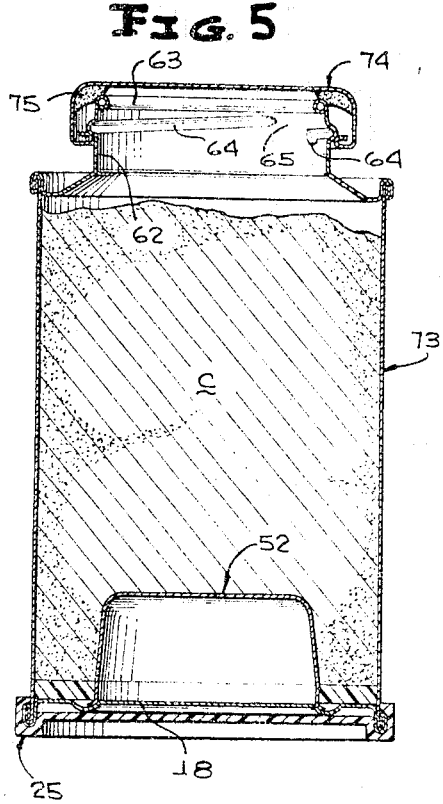
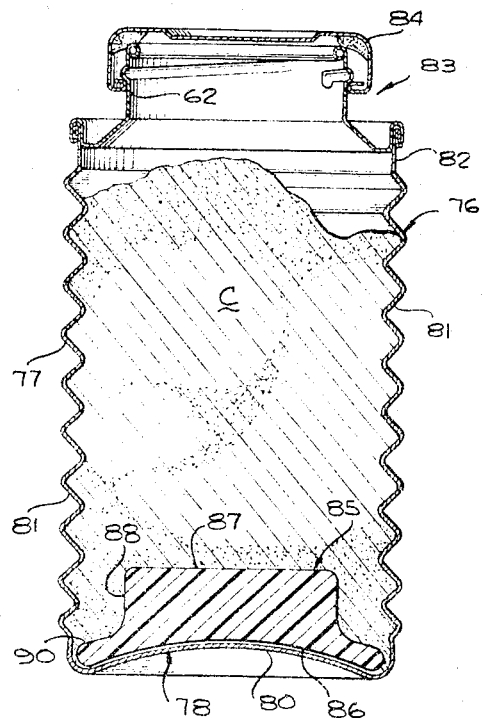
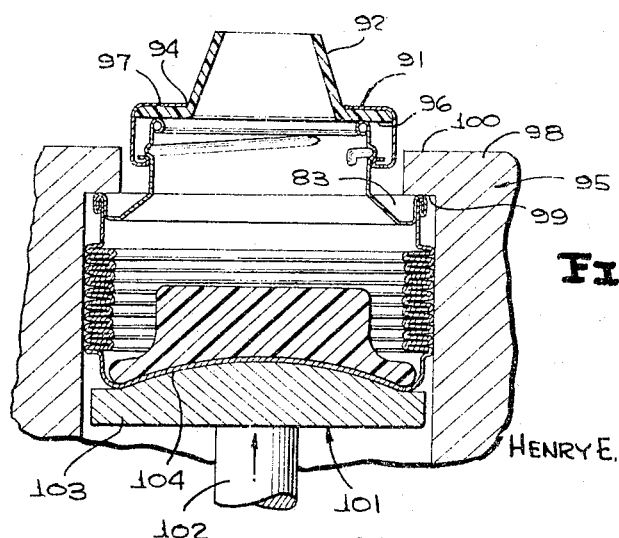
INVENTOR
HENRY E. FRANKENBERG
BY
ATTORNEYS

United States Patent Office 3,289,891
Patented Dec. 6, 1966

3,289,891
FOOD CONTAINERS FOR MANNED SPACE SHIPS
Henry E. Frankenberg, Berwyn, Ill., assignor to Continental Can Company, Inc., New York, N.Y., a corporation of New York
Original application Nov. 6, 1962, Ser. No. 235,668. Divided and this application Sept. 7, 1965, Ser. No. 485,433
11 Claims. (Cl. 222—92)

This application constitutes a divisional application of my copending commonly assigned application for U.S. Letters Patent, Serial No. 235,668, filed November 6, 1962.

This invention relates to containers with content-expelling means, particularly adapted for use in manned space ships, space capsules, and diverse spacecrafts whether in suborbital, orbital or interplanetary flight.

An object of this invention is to provide a novel container having ends which are removable whereby the container may be opened, one open end of the container forming an access opening by way of which container contents may be expelled through the other open end of the container.

Another object of this invention is to provide a dispensing mouthpiece on one end of a container to facilitate the expulsion of the container contents directly from the container to the mouth of a space traveller.

Another object of this invention is to provide a container of the type having an expelling plate with at least one overcap to reclose the container after the ends thereof have been removed and the contents thereof have been expelled, and in addition, to provide for the use of the container as a storage device for a severed container end and the expelling plate.

A further object of this invention is to provide for maximum fluid expulsion from a container by contouring an expelling plate thereof to the shape of the expelling or dispensing end of the container.

Another object of the invention is the provision of a container having one end thereof weakened by a circumferential score line and the other end provided with an open threaded neck portion having secured thereupon a lug or screw-type cap.

Still another object of this invention is the provision of a container having duplicate open ends whereby the removal of a cap associated with each end allows access to and expulsion of the contents thereof from either end of the container.

Yet another object of this invention is the provision of a container constructed to collapse along its longitudinal axis by means of an ejector plunger, thereby allowing the container contents to be efficiently and rapidly expelled from the container.

Another object of the invention is to provide a container having at least one flat surface thereof available for contact with a thermostat of an associated heating device.

With the above and other objects in view that will hereinafter appear, the nature of the invention will be more clearly understood by reference to the following detailed description, the appended claims and the several views illustrated in the accompanying drawings:

FIGURE 1 is an enlarged vertical sectional view through a container of this invention, and illustrates an overcap secured to the bottom end of the container and an expelling plate contoured to the internal configuration of an upper dispensing neck upon which is seated a screw-type cap.

FIGURE 2 is an enlarged vertical sectional view through a modified container having duplicate upper and lower open end portions each of which is closed by respective lug-type caps.

FIGURE 3 is a transverse sectional view taken along line 3—3 of FIGURE 2, and illustrates the interlocking relationship between the lug-type cap and the upper end portion of the container.

FIGURE 4 is a fragmentary elevational view with parts broken away and shown in section of the upper portion of the container and cap illustrated in FIGURE 2, and shows a piece of tape securing the cap upon the upper end portion of the container.

FIGURE 5 is an enlarged vertical sectional view through a modified container which is similar to the container illustrated in FIGURE 1, and differs therefrom in that the container has a neck cooperative with a partial-turn twist-off type cap.

FIGURE 6 is an enlarged vertical sectional view through a modified container having a plurality of circumferentially extending and axially spaced beads whereby the container may be collapsed along its longitudinal axis, and an internal expelling plate contoured to the configuration of an upper container end portion.

FIGURE 7 is a vertical sectional view of the container of FIGURE 6 and illustrates the container in its collapsed position within an ejector device.

Prior to the initiation of projection Mercury, the concept of manned orbital space flights was a fantasy. The successful orbital flights of the Mercury Astronauts evidenced the fact that man in space is a reality. Projects Dynasoar and Apollo, instituted by the U.S. Air Force and NASA, respectively, forecast manned orbital flights of a sustained duration and interplanetary flights within the not-too-distant future. A primary concern of each of the above-mentioned projects is the proper nourishment of and the means capable of supplying the nourishment to an astronaut in orbital or interplanetary flight. Sustained weightlessness and the present limitations in the size of spacecraft renders containers and their contents, heretofore considered satisfactory, inadequate.

A container designed to overcome the present shortcomings in existing containers and specifically constructed for use during space flights is illustrated in FIGURE 1 of the drawings, and is generally designated by the reference numeral 13. The container 13 includes a cylindrical container body 14 constructed of aluminum or similar lightweight material. Closures 17, 19 are secured to the body 14 at upper and lower ends thereof respectively, by conventional square-type double seams 16. The closures 17, 19 include inwardly directed recessed end panels 15, 18 respectively. The closure 19 is imperforate while the closure 17 terminates in an opening (unnumbered) defined by an upstanding circular flange 31. An outer surface 20 of the end panel 18 is provided with a circumferential score line adapted to facilitate the removal of the end panel 18 during a dispensing operation. An outwardly directed annular bead 22 is formed in each of the end panels 15, 18 of the respective closure 17, 19.

The container 13 also includes an upper closure or end 33 having an upstanding threaded neck 35 secured to the flange 31 and terminating in an inwardly directed flange portion 36. A screw-type cap 37 is seated upon the neck 35, in the manner clearly illustrated in FIGURE 1 of the drawings. Suitable sealing compound 38 is disposed between the cap 37 and the flange portion 36 of the neck 35.

An expelling plate 23 is housed within and guided by the body 14 for movement therein, and is normally positioned in abutting relationship with the recessed end panel 18 of the closure 19. The expelling plate 23 includes an annular plate 24 formed of plastic material having a circular opening 25. An expelling boss 26 of a frusto-conical configuration is force fitted within the opening 25. An outwardly directed peripheral flange 27 of the expelling boss 26 is secured to the recessed end panel 18 of the closure 19 by means of solder or the like. The expelling boss 26 includes a tapered peripheral wall 28 and an integral circular top face 29. The expelling boss 26 is contoured for mating reception within the neck 35 of the container 13. Such configuration allows the expulsion or dispensing of an optimum quantity of the container contents C from the container 13, as will appear more fully hereinafter.

A lower overcap or closure cap 40, constructed of polyethylene or like soft resilient material, is secured in liquid-tight relationship to the lower seam 16 of the container 13. The overcap 40 includes an inwardly recessed end panel 41, an integral bead 42, a depending peripheral skirt portion 43 and a peripheral tapered locking lip 44.

In dispensing the contents of the container 13, the overcap 40 is first removed from the container body 14 after which the closure 19 is placed in contact with a thermostatic heating device (not shown), if it is desired to heat the container contents C. The scored lower end panel 18 is punctured by a rotatable cutting tool (not shown). A pliable nipple, similar to the nipple 91 of FIGURE 7, is threaded upon the neck 35 of the container after the closure 37 has been removed.

The container 13 is then placed in an ejecting or ejector device similar to the ejector device 95 illustrated in FIGURE 7. A component of the ejector device is an axially movable ejector plunger 101 which includes an ejector head 103 and a depending shaft 102. The shaft 102 is coupled to the ejector device by suitable means (not shown) and functions to advance and retract the ejector head 103. In lieu of the upper convex surface 104 of the ejector head 103, the ejector head associated with the container 13 has an upper surface which is provided with an annular groove (not shown) which receives the annular bead 22 of the closure 19. The annular bead 22 cooperates with the annular groove (not shown) to provide a seat during the advancement of the ejector head 103. If desired, the ejector head 103 can also be rotated and may also be provided with a plurality of shear points (not shown) arranged circumferentially about the ejector head peripherly in axial alignment with the weakened score line of the end panel 18 to sever the end panel completely upon the rotation of the head 103.

Initially the ejector plunger modified as noted above is in axial alignment with the container body 14 and disposed slightly below or in abutment with the lower end panel 18. The ejector plunger is advanced and rotated by a suitable mechanism if the end panel 18 had not been previously completely severed along the score line. As the ejector plunger is rotated, the shear edges thereof (not shown) completely sever the end panel 18 from the body 14. Continued advancement of the ejector plunger forces the expelling plate 23 upwardly toward the neck 35 thereby expelling the contents of the container 13 outwardly through the nipple (not shown). Due to the configuration of the expelling boss 26 and the neck 35 an optimum quantity of the container contents C is dispensed from the container 13.

When the container contents C are completely consumed, the ejector plunger is withdrawn from the body 14, the nipple is removed, the closure 37 is replaced to its initial position (FIGURE 1) and the reclosure cap 40 is forced over the seam 16 thus completely closing the container 13 with the end panel 18 and the expelling plate 23 housed in the container body 14. The closed container 13 is then stored.

A container 56 having a body 57, identical upper and lower open portions 58 and closures 60 is illustrated in FIGURE 2 of the drawings. Each body portion 58 includes a peripheral bead 61 adapted to retain the container 56 within an ejector device by suitable clamping means (not shown). A neck 62 extends longitudinally outwardly of each bead 61 and terminates in an inwardly directed curl 63. Duplicate diametrically opposed threaded portions 64 are formed on the neck 62 and terminate in lug access openings 65 which are also diametrically opposed. Each closure 60 includes an end or end panel 66 having an inwardly directed annular bead 67 adapted to cooperate with the curl 63 to form a guide for aligning the cap 60 upon the container body 57. A skirt 68, terminating in two inwardly, radially directed diametrically opposed locking lugs 70 is joined to each end 66. A suitable compound 71 provides a seal between the closures 60 and the container body 57. A strip of pressure-sensitive or other suitable tape 69 (FIGURE 4) positively secures each closure 60 upon the body 57 to preclude accidental or inadvertent removal of the closure 60 from the container. An expelling plate 72, similar to the expelling plate 23, is seated upon the lower curl 63 internally of the body 57.

To dispense the contents of the container illustrated in FIGURE 2, the tape 69 is first removed, the container is heated if desired, and thereafter both closures 60 are removed. A suitable dispensing type closure having a spout, such as the dispensing type closure 91 illustrated in FIGURE 7, but modified to cooperate with the thread 64, and access openings 65, is then secured to the top portion 58 of the container 56. The container 56 is then placed in an ejection device similar to that heretofore described in connection with FIGURE 7, and the container contents C of the container 56 may, in a similar fashion, be dispensed. It should be particularly noted that no severance of the body 57 or the closures 60 occurs when the structure illustrated in FIGURE 2 is employed to expel or dispense the container contents C. The plunger head (not shown) used in conjunction with the container 56 does not have the shear points heretofore noted and is merely designed for entrance into the container body 57 through either open end thereof.

In FIGURE 5 of the drawings is illustrated a container 73 which is, in effect, a composite of the containers illustrated in FIGURES 1 and 2. That is, the container 73 includes the identical expelling boss 26, annular plate 24, container closures 17, 19 and the overcap or closure cap 40 as are illustrated in FIGURE 1. The container 73 includes the identical neck 62, curl 63, diametrically opposed threaded portions and lug recesses 64, 65 respectively as are illustrated in FIGURE 2. A closure 74 is substantially a duplicate of the closure 60 illustrated in FIGURE 1, differing therefrom only in the absence of the inwardly directed annular guide bead 67 of the closure 60. A suitable sealing compound 75 is placed within the cap 74 between the cap 74 and the curl 63. The method of dispensing the contents C of the container illustrated in FIGURE 5 is identical to the method employed in dispensing the contents of the container illustrated in FIGURE 1.

A container 76 including a body 77 and an integral closure or end panel 78 of concave configuration is illustrated in FIGURE 6 of the drawing. An end wall 80 of the closure 78 is thicker than the body 77 for a purpose to be hereinafter discussed. A plurality of beads 81 are formed in the container body 77 to facilitate the collapsing thereof. The body 77 is closed at an upper end 82 by an upper closure 83, substantially identical to the upper closure illustrated in FIGURE 5. A cap 84, similar in structure and operation to the twist-type cap 74 illustrated in FIGURE 5 is seated upon the neck 62 of the end portion 83.

A one-piece expelling plate 85 is located internally of the container body 77 and includes a lower concave portion 86 contoured to the configuration of the integral closure 78. The expelling plate 85 has a top circular face 87, a depending peripheral side wall 88, and an outwardly directed flange portion 90. The expelling plate 85 is contoured to the general configuration of the neck 62 to facilitate expulsion of an optimum quantity of the container contents C.

To remove the contents C from within the body 77 the twist-type closure or cap 84 is first removed and the closure 91 is secured upon the neck 62 in the manner illustrated in FIGURE 7 of the drawings. The closure 91 includes a pliable expelling spout 92 made of polyethylene or similar pliable material. The spout 92 extends through an opening 94 of the closure 91 and an integral radial flange 96 of the spout 92 is suitably secured to an upper end panel 97 of the closure 91.

The container 76 is placed within a housing of the ejecting or ejector device 95 with the upper end portion 82 of the container 76 in partial abutment with a face 99 of an annular housing flange 100. The ejector plunger 101 is a component of the ejecting device and includes the heretofore mentioned shaft 102. The ejector head 103 has an upper convex surface 104 contoured to the general configuration of the end wall 80 and the concave portion 86 of the expelling plate 85 is secured to the shaft 102. As the expelling plate 85 is moved upwardly from the position illustrated in FIGURE 6 to the position illustrated in FIGURE 7, the body 77 thereof collapses endwise and the container contents C is expelled through the pliable spout 92. The ejector plunger 101 may be moved in the direction of the arrow in FIGURE 7 either manually or by appropriate mechanical mechanisms. The thickened end wall 80 assures accurate alignment of the ejector head 103 against the concave closure or end 78, and precludes distortion of the closure 78 from the force created by the ejector plunger 101.

It is within the scope of this invention to dispense both food and nonfood products of a semisolid, paste-type or fluid consistency from within containers constructed in accordance with this disclosure. Such nonfood products such as liquid or paste-type vitamins as well as distilled water can comprise the contents C of the disclosed container. Additionally, stimulants such as coffee may form the contents C of the disclosed containers.

While example disclosures of containers with expelling means for use in manned spacecraft are shown herein, it is to be understood that changes in the disclosed containers and their components may be made without departing from the spirit and scope of the invention as defined in the appended claims.

I claim:

1. A container comprising a body having opposite end portions, a closure at each of said end portions, one of said end portions terminating in an inwardly directed reinforced peripheral edge, an expelling plate normally housed in said body adjacent said one end portion, said expelling plate and body being substantially circular in cross-section, said expelling plate including an enlarged portion and a reduced portion, said reduced portion being telescopically received within said reinforced peripheral edge and said enlarged portion including a peripheral portion in overlying relationship to said reinforced peripheral edge.

2. A container comprising a body having opposite end portions, a closure at each of said end portions, said end portions being identical and including an inwardly directed reinforced peripheral edge, an expelling plate normally housed in said body adjacent said one end portion, said expelling plate and body being substantially circular in cross-section, said expelling plate including an enlarged portion and a reduced portion, said reduced portion being telescopically received within one of said reinforced peripheral edges, and said enlarged portion including a peripheral portion in overlying relationship to said one reinforced peripheral edge.

3. The container as defined in claim 1 wherein said peripheral edge is an inwardly directed curl, each of said closures being removably threadably connected to said body, and means forming a portion of said body for retaining the container in an ejector device.

4. A container comprising an imperforate body having upper and lower end portions, upper and lower closures at said respective upper and lower end portions, said upper end portions terminating in a neck of reduced size as compared to said body, said upper closure being an openable closure, an expelling plate located internally of said body normally adjacent said lower closure, said expelling plate being movable toward said openable closure whereby contents of the container are expelled through the upper end portion of the body, said expelling plate having a portion contoured to the general cross-sectional configuration of said body, another portion of said expelling plate being contoured to the general cross-sectional configuration of said neck whereby optimum container contents expulsion quantitywise is achieved, said lower closure and body being of imperforate one-piece construction, and said lower closure and an opposed surface of said first-mentioned expelling plate portion being complementally recessed and internested.

5. A container comprising an imperforate body having upper and lower end portions, upper and lower closures at said respective upper and lower end portions, said upper end portions terminating in a neck of reduced size as compared to said body, said upper closure being an openable closure, an expelling plate located internally of said body normally adjacent the interior surface of said lower closure, said expelling plate being movable toward said openable closure whereby contents of the container are expelled through the upper end portion of the body, said expelling plate having a portion contoured to the general cross-sectional configuration of said body, another portion of said expelling plate being contoured to the general cross-sectional configuration of said neck whereby optimum container contents expulsion quantitywise is achieved, said lower closure being imperforate, and said body is provided with a plurality of annular beads whereby the body can be quickly and uniformly endwise collapsed to expel the container contents therefrom.

6. A container comprising an imperforate body having upper and lower end portions, upper and lower closures at said respective upper and lower end portions, said upper end portions terminating in a neck of reduced size as compared to said body, said upper closure being an openable closure, an expelling plate located internally of said body normally adjacent said lower closure and secured thereto along a score line, said expelling plate being movable toward said openable closure whereby contents of the container are expelled through the upper end portion of the body, said expelling plate having a portion contoured to the general cross-sectional configuration of said body, another portion of said expelling plate being contoured to the general cross-sectional configuration of said neck whereby optimum container contents expulsion quantitywise is achieved, the lower closure being of one-piece imperforate construction and being secured to the body by a seam, and an overcap removably secured to the seam of said container for reclosing the container after a dispensing operation.

7. A container comprising an imperforate body having upper and lower end portions, upper and lower closures at said respective upper and lower end portions, said upper end portion terminating in a neck of reduced size as compared to said body, said upper closure being an openable closure, an expelling plate located internally of said body normally adjacent said lower closure, said expelling plate being movable toward said openable closure whereby contents of the container are expelled through the upper end portion of the body, said expelling plate having a portion contoured to the general cross-sectional configuration of said body, and another portion of said expelling plate being contoured to the general cross-sectional configuration of said neck whereby optimum container contents expulsion quantitywise is achieved; said lower closure being of one-piece imperforate construction and wherein the first mentioned portion of the expelling plate is an upstanding boss and said another expelling plate portion has a lower recess, and said lower closure is contoured to the configuration of said recess whereby the lower closure and recess are adapted to mate for simultaneous movement longitudinally toward said upper end body portion.

8. The container as defined in claim 6 wherein the upper end closure is provided with a pliable expelling spout to facilitate expulsion of the container contents therethrough.

9. The container as defined in claim 6 wherein the first mentioned portion of the expelling plate is an upstanding boss and said another expelling plate portion is provided with an opening, and said boss is secured in said opening.

10. In a dispensing container of the type including a container body closed at one end by a closure and an expelling plate in said body adjacent said closure, the improvement comprising means securing said expelling plate to a portion of said closure, and means for facilitating the opening of said closure without effecting the securing means whereby the expelling plate and a portion of the closure are moved simultaneously relative to said body during a dispensing operation wherein said closure includes a flattened disc-like annular reinforcing panel.

11. In the dispensing container as defined in claim 10 wherein said opening facilitating means includes a weakened line, said closure including an annular reinforcing panel.

References Cited by the Examiner

UNITED STATES PATENTS

| | | | |
|---|---|---|---|
| 1,235,550 | 8/1917 | Carmody | 222—95 X |
| 1,595,889 | 8/1926 | Stevens | 222—386 X |
| 1,761,650 | 6/1930 | Beardsley et al. | 222—386 |
| 2,090,111 | 8/1937 | Creveling | 222—386 |
| 2,125,258 | 7/1938 | Bagley | 222—391 |
| 2,125,259 | 7/1938 | Bagley | 222—391 |
| 2,131,487 | 9/1938 | Tear | 222—386 |
| 2,753,088 | 7/1956 | Prahl | 222—215 |
| 2,887,253 | 5/1959 | Biedenstein | 222—327 |
| 3,135,418 | 6/1964 | Tracy | 220—60 |
| 3,143,429 | 8/1964 | Swanson et al. | 222—215 |

FOREIGN PATENTS 312,141  5/1919  Germany.

ROBERT B. REEVES, *Primary Examiner.*

HADD S. LANE, *Examiner.*